United States Patent [19]
Archuleta et al.

[11] Patent Number: 5,425,407
[45] Date of Patent: Jun. 20, 1995

[54] SCREW PLUG FOR TIRE PUNCTURES

[76] Inventors: Vincent Archuleta, 2882 Glenmore, Salt Lake City, Utah 84106; Edward Archuleta, 4730 S. 2200 West #6, Salt Lake City, Utah 84118

[21] Appl. No.: 692,189

[22] Filed: Apr. 26, 1991

[51] Int. Cl.$^6$ ............... B29C 73/06; F16B 35/04
[52] U.S. Cl. ........................ 152/370; 156/97; 411/399; 411/412; 411/426; 411/907
[58] Field of Search ............. 152/370; 52/514; 411/436, 437, 426, 412, 310, 311, 399, 907, 908, 82, 258; 156/97

[56] References Cited

U.S. PATENT DOCUMENTS

| | | | |
|---|---|---|---|
| 476,316 | 6/1892 | Rodgers | 411/223 |
| 570,942 | 11/1896 | Merritt . | |
| 583,436 | 5/1897 | Hatch | 152/370 |
| 877,131 | 1/1908 | Searelle | 411/399 |
| 1,296,038 | 3/1919 | Baker | 411/245 |
| 2,075,453 | 3/1937 | Mullen | 152/370 |
| 2,199,809 | 5/1940 | Pigott | 411/399 |
| 2,727,554 | 12/1955 | Westfall . | |
| 2,739,352 | 3/1956 | Watson | 152/370 |
| 2,902,074 | 9/1959 | Langdon . | |
| 3,174,524 | 3/1965 | Nitzsche . | |
| 3,175,599 | 3/1965 | Clifford . | |
| 3,207,023 | 9/1965 | Knohl | 411/412 |
| 3,296,048 | 1/1967 | Wolfe . | |
| 3,308,867 | 3/1967 | Nitzsche . | |
| 3,842,887 | 10/1974 | Mendes . | |
| 3,897,713 | 8/1975 | Gugle | 411/82 |
| 4,096,901 | 6/1978 | Reichenbach . | |
| 4,279,343 | 7/1981 | Alfanta . | |
| 4,479,748 | 10/1984 | Uhlmann | 411/437 |
| 4,579,161 | 4/1986 | Roberts . | |
| 5,053,089 | 10/1991 | Ristich | 152/370 |

FOREIGN PATENT DOCUMENTS

| | | | |
|---|---|---|---|
| 1118441 | 4/1955 | Germany | 152/370 |
| 0831501 | 3/1960 | United Kingdom | 152/370 |

*Primary Examiner*—Michael W. Ball
*Assistant Examiner*—Daniel J. Stemmer
*Attorney, Agent, or Firm*—L. Ronald Jorgensen

[57] ABSTRACT

A repair plug for sealable insertion into puncture holes in tires has a conical shank carrying one or more buttress threads which may extend onto a head portion adapted for rotation with a screwdriver.

20 Claims, 5 Drawing Sheets

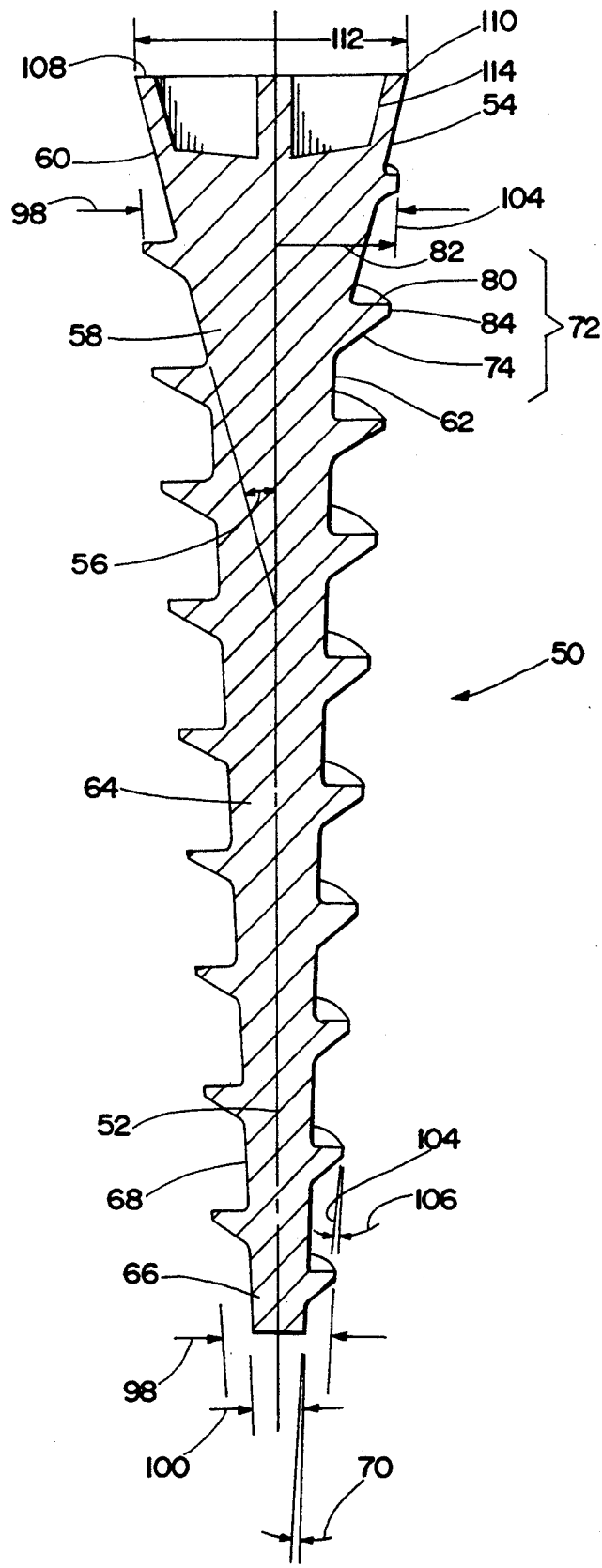
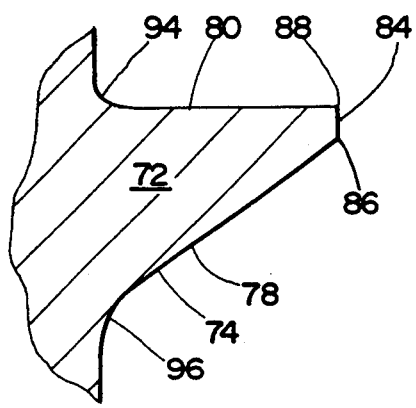
Fig. 3
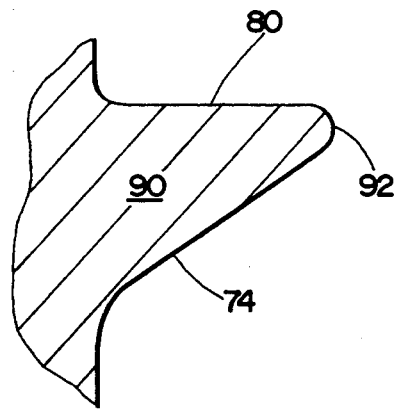
Fig. 4
Fig. 2

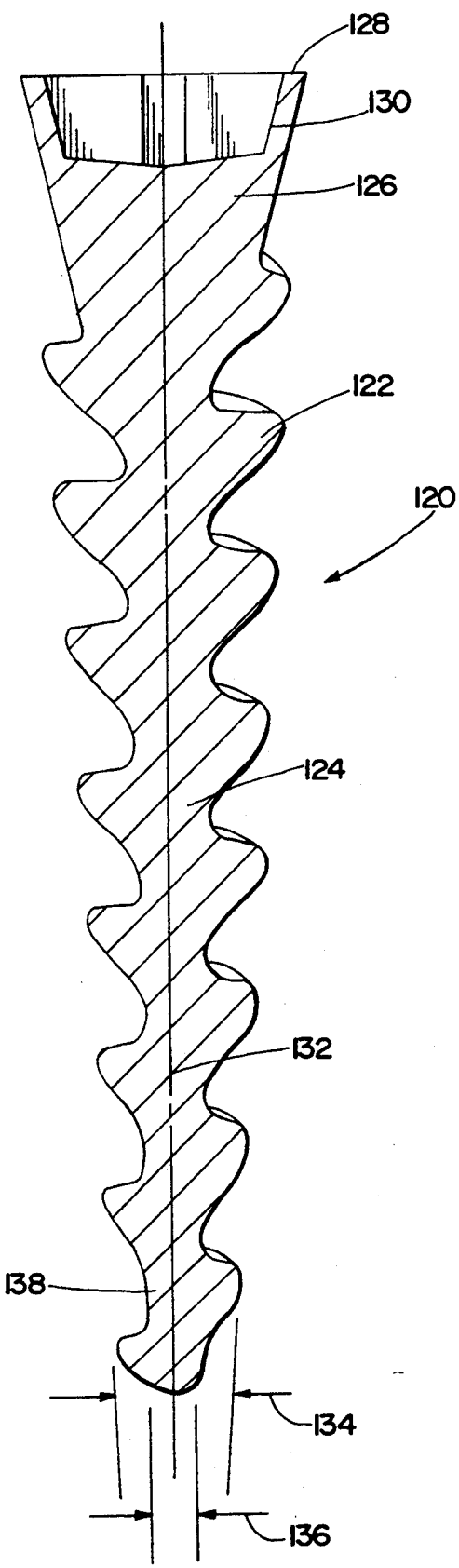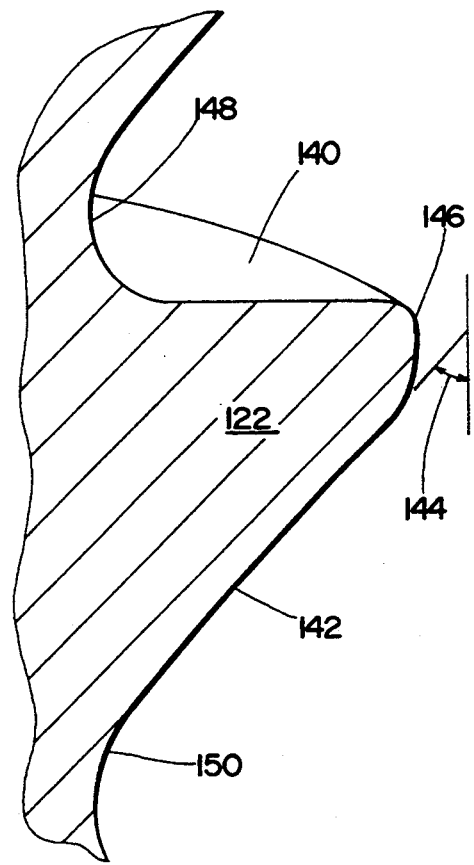
Fig. 5
Fig. 6

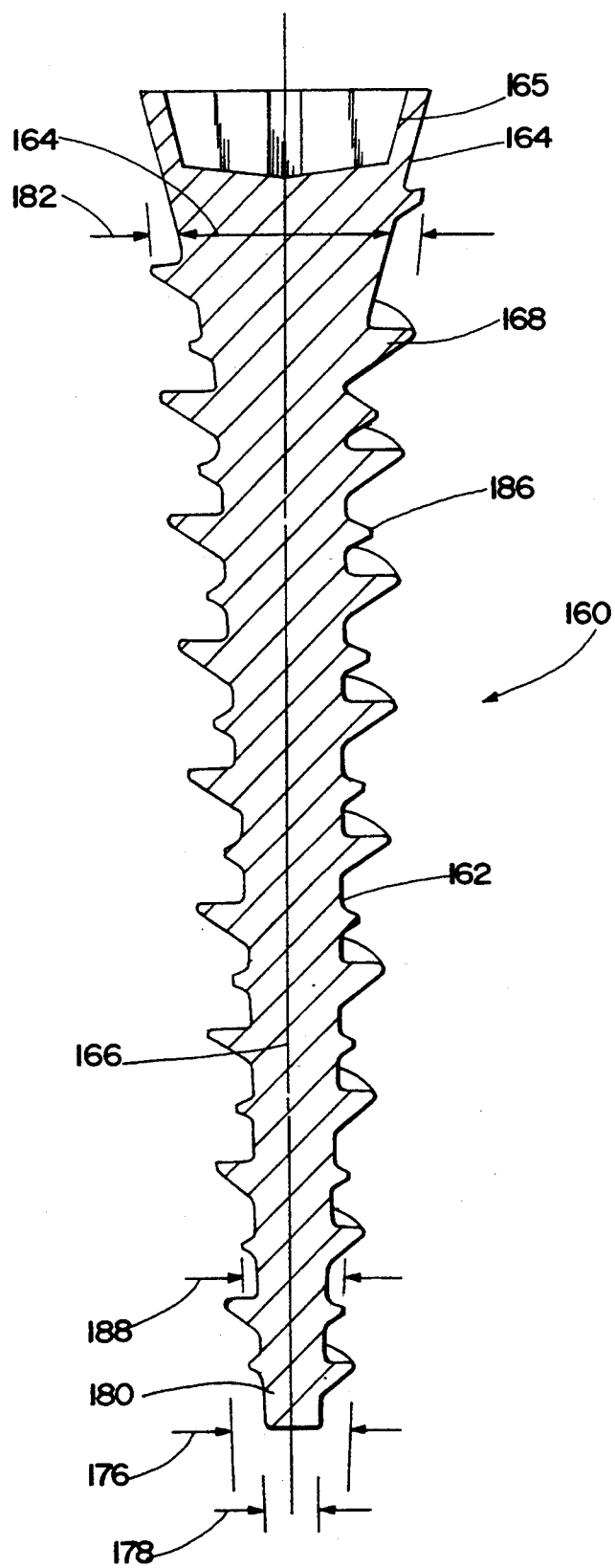
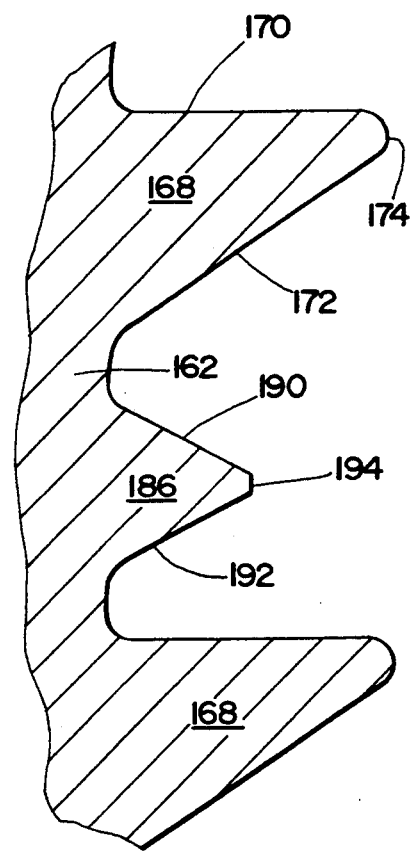
Fig. 7
Fig. 8

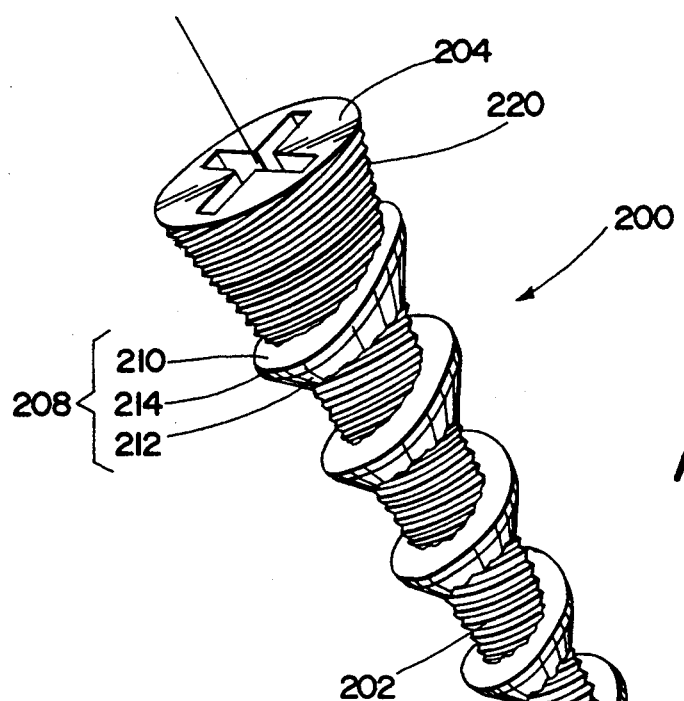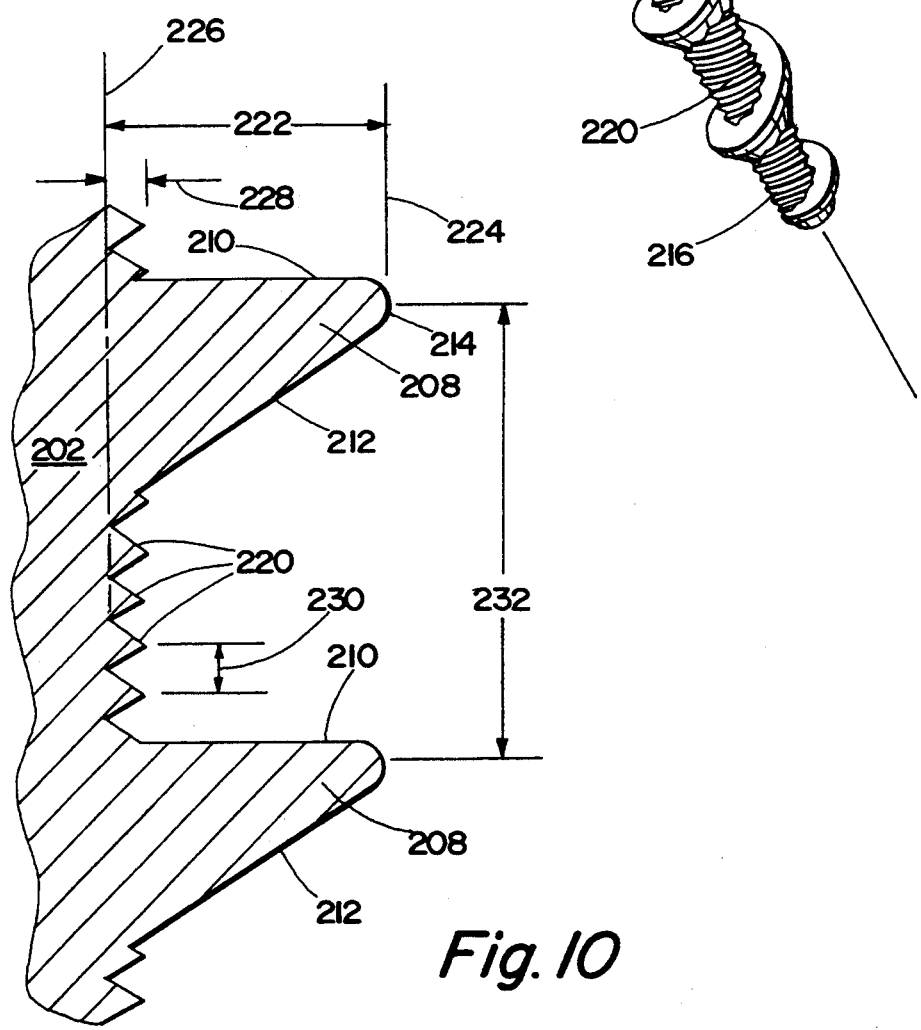

SCREW PLUG FOR TIRE PUNCTURES

BACKGROUND OF THE INVENTION

1. Field

This invention relates to the art of tire repair, and more particularly to an improved method and tire repair plug for repairing and sealing punctures in vehicle tires.

2. State of the Art

Various means for repairing tire punctures are disclosed in the prior art, all of which may be considered to be types of plugs which are sealably inserted into the puncture hole.

Some plugging devices are designed to be inserted into the puncture hole from the interior side (i.e. normally pressurized side) of the tire. Exemplary of such plugs are those found in U.S. Pat. No. 3,308,867 of Nitzsche, U.S. Pat. No. 2,902,074 of Langdon, U.S. Pat. No. 3,842,887 of Mendes and U.S. Pat. Nos. 4,579,161 and 4,802,388 of Roberts. The use of such plugs is disadvantageous because it requires removal of the tire from the rim. Thus, roadside repairs are generally impractical. For the typical motorist, the repair must be performed in a commercial automotive tire repair shop at extra time and expense.

Other plugs are designed to be driven or pulled into a puncture with a removable rod or "needle." Such devices are described in U.S. Pat. No. 2,966,189 of Chambers et al., U.S. Pat. No. 3,174,524 of Nitzsche and U.S. Pat. No. 3,175,599 of Clifford.

The patent literature describes tire plugs which may be inserted into a puncture hole from the outside of the tire. Many have screw threads or circumferential ribs on the device which assist in retaining the plug within the puncture hole.

U.S. Pat. No. 570,942 of Merritt discloses a tapered screw having an enlarged head for receiving a machine screw. The underside of the screw head is concave for sealing against the tire surface. The tapered screw has fine V-threads of small pitch.

U.S. Pat. No. 2,727,554 of Westfall discloses a hollow, ribbed, cylindrical plug which is forced into a puncture hole by a rod. After insertion, a sealing "washer" within the hollowed plug remains rigid while the remaining plug portion collapses under the tire compression.

U.S. Pat. No. 4,279,343 of Alfanto describes an insertable resilient tire plug having a hollow body for containing a liquid rubber compound. The body has axial fins and a threaded head. During insertion, the plug body is twisted to wring out the liquid from the plug chambers.

U.S. Pat. No. 3,296,048 of Wolfe discloses a screw type plug for a tire puncture. The plug has standard symmetrical V-threads and the head is cut off by a hacksaw after installation.

U.S. Pat. No. 4,096,901 of Reichenbach discloses a rigid threaded tire plug including a tapered portion with standard symmetrical V-threads, and a fracturable finger-gripping handle.

U.S. Pat. No. 4,827,998 describes a threaded plug having a cylindrical non-tapered resilient shroud encasing a rigid screw.

All of the aforementioned tire plugs have disadvantages. Some of the plugs comprise multiple parts, resulting in added manufacturing expense. Others require removal of the tire from the vehicle wheel for repair. Specialized tools are required to install some plugs. Additionally, the ability of many plugs to maintain a permanent seal is highly dependent upon the installer's technique. A single component tire plug is needed which is readily formed, easy to install, has sufficient flexibility to absorb tire movement while maintaining a seal, and is resistant its ejection from the puncture hole.

SUMMARY OF THE INVENTION

The invention is a threaded tire plug for sealable insertion into the puncture hole of a tubeless tire typically used on motorized and non-motorized vehicles.

The plug is configured to specifically resist ejection from the puncture under the combined forces of compressed air in the tire and centrifugal force.

The plug is formed of hard rubber, other relatively rigid elastomer, or tough plastic, and is easily inserted, accompanied by tire cement, into a puncture hole, with a screwdriver. Materials such as hard rubber are advantageously reinforced with interior fibrous or metal reinforcement.

The tire plug has a truncated conical shank with a longitudinal central axis. The axis extends from one end having a larger diameter to an opposing smaller diameter end which is the end inserted into the puncture hole.

At its larger end, the shank is integrally joined to or formed with a truncated conical head portion. The smaller end of the head portion is joined to the larger end of the shank. The larger end of the head portion is generally flat or slightly rounded and is adapted to be rotated by a screwdriver.

External buttress screw threads are integrally formed on the surface of at least the shank and preferably onto the adjoining tapered portion of the head as well. The buttress screw thread has an upper pressure face or flank which is substantially perpendicular to the central axis. The lower, or buttress face or flank of the screw thread has a generally plane surface whose cross-section is about 25 to 55 degrees from the axial direction. A helical thread crest connects the outer peripheries of the pressure face and the buttress face. The crest lies in, circumscribes and defines the surface of a truncated cone. Thus, the major diameter of the thread continuously increases from the insertion end of the tire plug to the head.

More than one thread may be utilized. A second thread may be similar to the first thread, or may have another configuration and/or size. A double-threaded plug is contemplated in which the primary thread is a buttress thread and a secondary thread intermediate between turns of the primary thread has a smaller major diameter than the primary thread.

The buttress thread simultaneously results in (a) less resistance to insertion of the plug into the puncture hole and (b) greater resistance to forcible ejection of the plug from the puncture hole.

The conical form circumscribed by both the shank and the threads thereof results in steadily increasing compressive force between the tire and the tire plug as the plug is screwed into the puncture hole.

The screw plug is integrally formed as a single unit by molding or similar process.

The screw plug is to be used in combination with a "liquid" rubber compound, i.e. tire cement which softens the rubber surrounding the puncture. Such liquid sealants are well known in the art.

The above brief description of the invention and other features and advantages of the invention will become more apparent from a consideration of the following detailed description taken in conjunction with the accompanying drawings.

BRIEF DESCRIPTION OF THE DRAWINGS

In the drawings:

FIG. 2 is a sectional side view of the threaded tire plug of the invention;

FIG. 3 is an enlarged sectional side view of a portion of the external thread of the invention;

FIG. 4 is an enlarged sectional side view of another embodiment of the external thread of the invention;

FIG. 5 is a sectional side view of another embodiment of the threaded tire plug of the invention;

FIG. 6 is a sectional side view of the external thread of the embodiment of FIG. 5;

FIG. 7 is a sectional side view of a still further embodiment of the threaded tire plug of the invention;

FIG. 8 is an enlarged sectional side view of the external thread of the embodiment of FIG. 7;

FIG. 9 is a perspective view of another embodiment of the threaded screw plug of the invention; and FIG. 10 is an enlarged sectional side view of a portion of the external thread of the embodiment of FIG. 9.

DESCRIPTION OF THE ILLUSTRATED EMBODIMENTS

Figure 1:
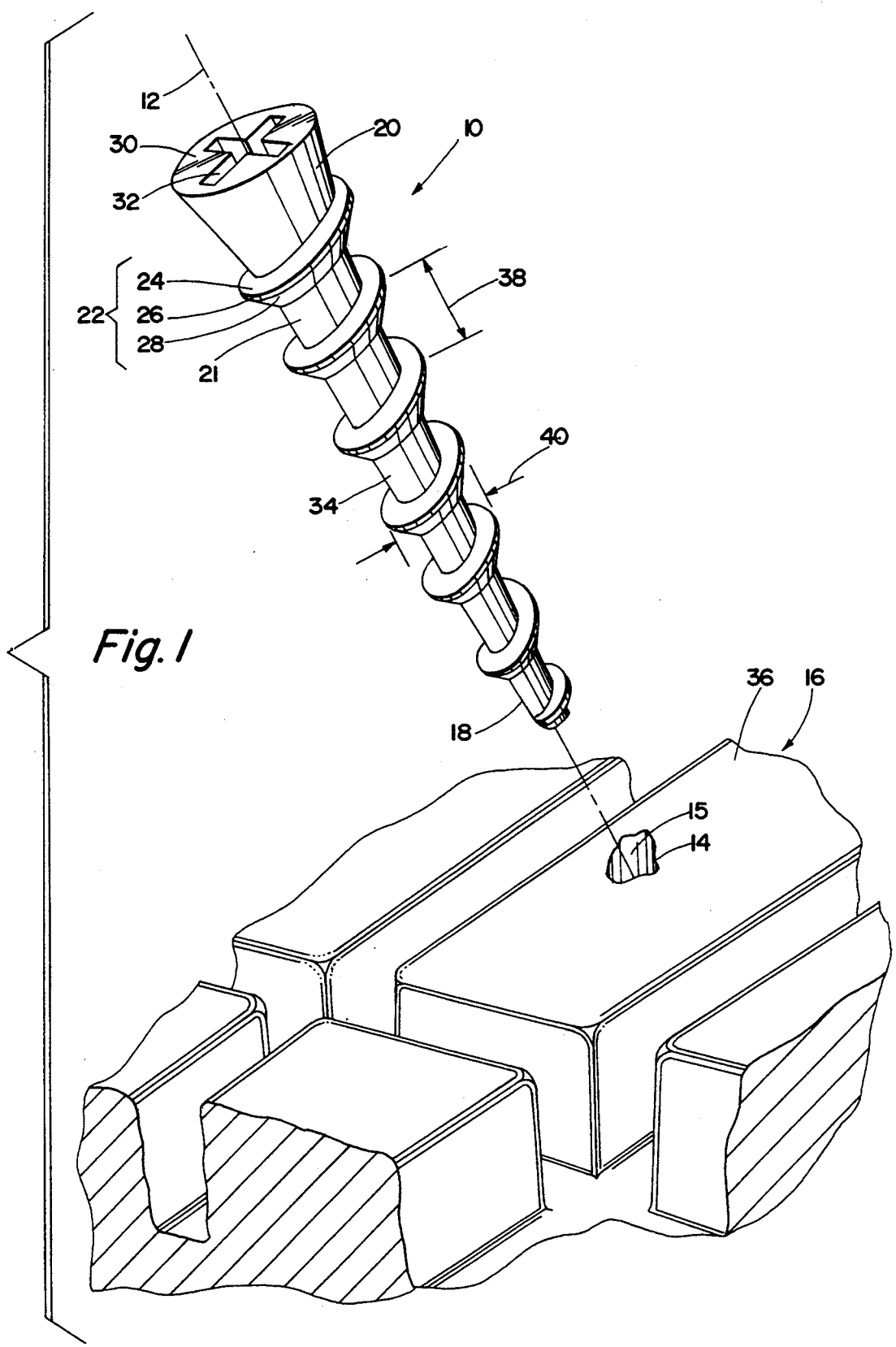
FIG. 1 is a perspective view showing a threaded tire plug of the invention and a puncture hole in a tire tread into which the plug is to be inserted.

In FIG. 1 is shown a tire puncture plug or screw plug 10 of the present invention. The plug 10 has a longitudinal axis 12 about which the plug is turned for insertion into a puncture hole 14 in tire 16. The plug 10 has an insertion end 18 of generally reduced diameter for insertion into hole 14. The opposing end is a head portion 20 which includes means for accepting a screwdriver. Such means are here shown as cross slots 32 on head end 30 for accepting a common Phillips head screwdriver, not shown.

The shank 34 of plug 10 is shown as comprising a truncated cone having an integrally formed continuous external thread 22 on its surface, Head portion 20 is shown as a truncated conical member having its smaller end integrally formed with or joined to the larger end 21 of shank 34.

External thread 22 is shown as a buttress thread having an upper, pressure ace or flank 24 which is substantially perpendicular to the central axis 12. The pressure face 24 may vary slightly from the perpendicular to axis 12 by about ±5 degrees.

The lower, i.e. buttress, face 28 of the thread intersects an axial plane at an angle of about 25 to 55 degrees from the axis, thus "buttressing" the thread against the high air pressure tending to push the plug 10 outwardly from the puncture hole 14.

The helical thread crest 26 comprising the outermost periphery of thread 22 is shown as defining a truncated cone as it circumscribes the shank 34.

The thread 22 has a pitch 38 shown here as a uniform pitch 38, i.e. the axial distance advanced per revolution is equal for all turns of the thread. However, a non-uniform pitch may be used. For example, the thread may be designed to have a uniform pitch ratio, i.e. the ratio of pitch 38 to the crest diameter 40 is maintained at a constant value.

The axial length of the plug 10 is such that insertion end 18 passes through the tire tread 36 and underlying tire layers, not shown, to enter the air space within the tire 16. The plug 10 is sized so that at least the larger end 21 of the shank 34 is larger than the gross size of the puncture hole 14. When installed in puncture hole 14, thread 22 and shank 34 are compressed by the walls 15 of hole 14 and become sealed to the walls 15.

FIG. 2 shows a screw plug 50 in cross-section having a central longitudinal axis 52. The ratio of overall length to maximum diameter may range from about 2.5 to about 9; the most useful plugs have an overall length/diameter ratio of between about 4.5 and 6.5. A typical plug 50 has a maximum head diameter of about 5/16 inch with an overall length of about 1½ to 2 inches.

The truncated conical head portion 54 of the plug 50 has a side surface 60 which forms an angle 56 with the central axis 52. Angle 56 may vary from about 1 degree to about 35 degrees; the preferred angle 56 is about 3–24 degrees.

The smaller end 58 of the head portion 54 adjoins the larger end 62 of shank 64, which is also in the form of a truncated cone with a smaller end 66 for initial insertion into a tire puncture. The side surface 68 of shank 64 forms an angle 70 with central axis 52. Preferably, head angle 56 is equal to or greater than shank angle 70, which is preferably between about 1 and 9 degrees and more preferably between about 2 and 6 degrees. Thus, in FIG. 2 the shank angle 70 is shown as about 2 degrees and the head angle is about 14 degrees.

In FIG. 2, a single external buttress type thread 72 is shown to be formed on the surface 68 of the shank 64. Thread 72 has a forward (or lower) face or flank 74 which is denoted herein as a buttress face. As shown in FIG. 3, this buttress face 74 forms an angle 78 with the central axis 52 of between about 35 and 60 degrees. As the angle 78 is decreased, the strength of the thread is increased.

Screw thread 72 has an upper or pressure face 80 which is substantially perpendicular to the central axis 52. The pressure face 80 is preferably not inclined more than ±5 degrees from the axis perpendicular or plug radius 82 as seen in FIG. 2.

A crest 84 joins the peripheral edges 86 and 88 of the pressure face 80 and buttress face 74. The crest may be flat as in thread 72 of FIG. 3 or as crest 92 rounded as in thread 90 of FIG. 4.

Preferably as shown in FIG. 3, the roots 94 and 96 of the thread, where it meets shank 64, are rounded to provide additional thread strength.

FIG. 2 illustrates an important feature of the invention. The ratio of major thread diameter 98 to minor thread diameter 100 is relatively large. This ratio DM/Dm is preferably in the range of from 1.3 to 3.3, and more preferably may be from 1.5 to 2.2.

The crest 84 of the helical thread 72 defines a continuously varying major buttress thread diameter 98 which circumscribes a truncated cone 104. The angle 106 of the cone surface 104 relative to the central axis is between about 1 degree and about 15 degrees, The preferred angle 106 is between about 1 degree and about 10 degrees. As shown in FIG. 2, the cone has a crest diameter 102 on the head end 54 and a smaller crest diameter 98 at the insertion end 66.

The buttress thread 72 has a pitch/major diameter ratio varying from a maximum of about 0.2–0.8 at the larger diameter, i.e. head end of the plug, to about 0.4–1.8 at the insertion end.

FIG. 2 shows the buttress thread 72 as extending onto part of the head portion 54. The thread 72 may be extended to the larger end 108 of the head portion 54, if desired. The outer rim 110 of the larger end 108, having a diameter 112, is shown as lying in the cone 104.

The end 108 is shown as having a screwdriver fitting 114, herein depicted as adapted for a Phillips head screwdriver.

Buttress type threads are used on machinery gears for efficient power transmission between generally non-resilient metal parts. The application to screw plugs in rubber tires is much different, however. The screw thread must form its own path as it advances and expands the resilient rubber of the tire.

Tire rubber, softened by an application of "liquid rubber compound" or "tire compound" is readily penetrated by the high strength buttress threads. Softened tire rubber enters the voids between the turns of the thread and then re-vulcanizes in those locations, providing resistance to outward movement of the screw plug from the tire.

The pressure face of the buttress thread is substantially perpendicular to the central axis. At this angle, the face provides the greatest possible resistance to pull-out or ejection of the plug from the puncture hole. The large ratio of major diameter DM to minor diameter Dm provides a large surface area to be acted on by the revulcanized tire rubber in preventing undesirable ejection of the plug from the puncture hole.

Another requirement of a plug for tire punctures is that a permanent seal be established to prevent air leakage despite the large flexural movements of the tire casing and thread. The large sealing surface area provided by this invention, together with the ability of the threads to deeply penetrate the tire rubber, results in improved sealing qualities.

In FIG. 5, another embodiment of the screw plug is depicted. Screw plug 120 is shown as resembling the screw plug 50 of FIG. 2, but having a somewhat differing shape of buttress thread 122. The buttress thread 122 has a major diameter 134 and a minor diameter 136, both shown as increasing from the insertion end 138 to the head end 126. The ratio of major diameter to minor diameter is between 1.3 and 3.3, preferably between 1.5 and 2.2.

The plug 120 has a shank 124 and a head portion 126, the latter having a driven end 128 with a screwdriver fitting 130. A longitudinal center axis 132 passes through the shank 124 and head portion 126.

FIG. 6 shows the buttress thread 122 in greater detail. A major portion of the pressure face 140 is substantially perpendicular to center axis 132 for providing maximum resistance to plug ejection.

A massive buttress face 142 is shown, inasmuch as the angle 144 between buttress face 142 and the central axis 132 is small, i.e. generally less than about 45 degrees.

The embodiment of FIG. 6 is shown as having rounded corners at the crest 146 and the roofs 148, 150.

A further embodiment of the invention is depicted in FIGS. 7 and 8, which may be considered together.

Screw plug 160 comprises a shank 162 and a head portion 164, both having a coaxial center axis 166. A screwdriver fitting 165 is shown in head portion 164.

An external continuous buttress thread 168, as previously described with respect to FIGS. 1–6, is integrally formed with or joined to the shank 162 (and preferably part of the head portion 164). As noted hereinbefore, the buttress thread 168 has an upper or pressure face 170, a lower or buttress face 172 and a crest 174. The buttress thread has a major diameter 176 and a minor diameter 178 at the insertion end 180. At the head portion 164, the buttress thread has a major diameter 182 and a minor diameter 184. Typically, the major and minor diameters increase from the insertion end to the head portion 164.

The application contemplates the use of two or three threads on the screw plug. The pitch for each thread must generally be increased so that both or all of the threads will fit onto the shank 162. The additional thread or threads may be of the same type and size as the primary thread, i.e. a buttress thread. The secondary thread may alternatively be of a design different from the primary thread. In FIGS. 7 and 8, the screw plug 160 is shown with a secondary V-thread 186 having a major diameter 188 less than the major diameter 176, 182 of the primary buttress thread 168. The secondary thread 186 is shown in FIG. 8 as having two mirror faces 190, 192 with a secondary thread crest 194 defining the major diameter 188.

The secondary thread may be of any size and type which increases the sealing surface area, the blockage of airflow by added penetration of the tire and resistance to ejection of the screw plug from the puncture hole.

Another feature of the screw plug is illustrated in FIG. 9. Unitary screw plug 200 comprises a shank 202 and an integrally formed head end 204 both aligned along central axis 206. A buttress thread 208 has an upper or pressure face 210, a buttress face 212 and a crest 214, the latter comprising the thread periphery. The shank 202 has an insertion end 216 for insertion into a puncture hole in a tire.

In accordance with this feature, a fine thread or ribbed structure 220 is formed on the surface of the shank 202 and/or head end 204. This thread or structure may comprise a series of circular ribs, each of which lies in a plane perpendicular to axis 206. In another form, a fine screw thread such as a simple V-thread as shown in FIG. 9 turns in the opposite direction from buttress thread 208. Thus, buttress thread 208 is exemplified as a right-hand thread while the fine screw thread 220 comprises a left-hand thread.

FIG. 10 shows a portion of the shank 202 and thread 208 in cross-section. Thread 208 is shown with a pressure face 210, buttress face 212 and crest 214, as previously described. The height 222 of the buttress thread, i.e. the distance 222 between the buttress thread major diameter 224 and minor diameter 226 is 2 to 8 times the height 228 of the fine screw threads 220 on shank 202.

The fine screw threads 220 is shown with a pitch 230 about 1/10 the pitch 232 of the buttress thread. In practice, pitch 230 may vary from about 1/12 to ½ of pitch 232. If desired, a plurality of continuous threads may be used, and the threads 220 may be spaced on the shank 202.

The fine screw threads 220 may be V-threads or any other type of thread which will provide added area for cementation of the screw plug to the tire rubber, retention of the screw plug sealed in the puncture hole, and prevent air leakage. The reverse thread or circular ribs 220 provides additional sealing area, and each portion of the thread abuts against a turn of the screw thread 208 to halt gas escape along the thread. The force required to screw the plug 200 into a puncture hole is slightly increased by the added resistance of a reverse screw thread, but enhanced sealing results.

Thus, the fine screw thread 220 differs from buttress thread 208 in respect to (a) the thread or rib direction of rotation, (b) the thread height, and (c) the thread pitch.

Reference herein to details of the illustrated embodiments of the invention is not intended to restrict the scope of the appended claims which themselves recite the features regarded as important to the invention.

What is claimed is:

1. A threaded tire plug for sealable insertion into a puncture hole of a tubeless tire, comprising:
    a truncated conical shank having a longitudinal central axis extending through a larger diameter end and an opposing smaller diameter end comprising an insertion end;
    a truncated conical head portion having its smaller end integrally joined to said larger end of said shank and its larger end adapted to be rotatively driven by a screw-driving tool, said conical shank having an angle of taper from the surface of the conical shank to said central axis which is less than the angle of taper from the surface of the control head to said central axis; and
    external buttress screw thread integrally formed on an external surface of said shank between said larger end and said smaller end of said shank, said screw thread having an upper pressure face having a surface substantially perpendicular to said central axis in the radial direction, a lower buttress face having a surface intersecting an axial plane at 25 to 55 degrees from the axis, and a helical thread crest defining a continuously varying major buttress thread diameter which circumscribes the surface of a truncated cone; wherein said buttress thread extends from said shank to cover a portion of said head portion.

2. The threaded tire plug of claim 1, wherein said upper pressure face is between about −5 degrees and +5 degrees from a radial line perpendicular to said central axis.

3. The threaded tire plug of claim 1, wherein the surface of said truncated cone defined by said major diameter of said buttress thread is tapered at an angle of between about 1 degree and 15 degrees relative said central axis.

4. The threaded tire plug of claim 1, wherein the surface of said truncated cone defined by said major diameter of said buttress thread is tapered at an angle of between about 1 degree and 10 degrees relative said central axis.

5. The threaded tire plug of claim 1, wherein said buttress thread is a single thread having a constant pitch.

6. The threaded tire plug of claim 1, wherein said buttress thread has a pitch/major diameter ratio varying from a maximum of about 0.2–0.8 at said larger diameter end of said plug to 0.4–1.8 at said insertion end of said plug.

7. The threaded tire plug of claim 1, wherein said plug has a ratio of overall length to maximum diameter of from about 2.5 to about 9.

8. The threaded tire plug claim 1, further comprising a second helical thread having turns intermediate said turns of said buttress thread.

9. The threaded tire plug of claim 8, wherein said second helical thread has a major diameter less than said major diameter of said buttress thread.

10. The threaded tire plug of claim 9, wherein said second helical thread comprises a non-buttress thread.

11. The threaded tire plug of claim 1, further comprising circular ribs circumscribing said shank between adjacent turns of said buttress screw thread, said circular ribs having a height of about $\frac{1}{8}$ to $\frac{1}{2}$ of the difference between said major buttress thread diameter and said minor buttress thread diameter.

12. The threaded tire plug of claim 1, further comprising a fine screw thread circumscribing said shank between adjacent turns of said buttress screw thread in a direction opposite the direction of said buttress screw thread, said fine screw thread having a height of about $\frac{1}{8}$ to $\frac{1}{2}$ of the difference between said major buttress thread diameter and said minor buttress thread diameter.

13. The threaded tire plug of claim 12, wherein said fine screw thread is a V-thread.

14. The threaded tire plug of claim 1, wherein said tire plug is made of rubber.

15. The threaded tire plug of claim 1, wherein said tire plug is made of synthetic elastomeric material.

16. The threaded tire plug of claim 1, wherein said tire plug is made of a plastic material.

17. The threaded tire plug of claim 1, wherein said angle of taper from the surface of the conical shank to said central axis is between about 1 and 9 degrees.

18. The threaded tire plug of claim 1, wherein said angle of taper from the surface of the conical head to said central axis is between about 1 and 35 degrees.

19. The threaded tire plug of claim 1, wherein said angle of taper from the surface of the conical head to said central axis is between about 3 and 24 degrees.

20. A threaded tire plug for sealable insertion into a puncture hole of a tubeless tire, comprising
    a truncated conical shank having longitudinal central axis extending through a larger diameter end and an opposing smaller diameter end comprising an insertion end;
    a truncated conical head portion having its smaller end integrally joined to said larger end of said shank and its larger end adapted to be rotatively driven by a screw-driving tool;
    external buttress screw thread integrally formed on an external surface of said shank between said larger end and said smaller end of said shank, said screw thread having an upper pressure face having a surface substantially perpendicular to said central axis in the radial direction, a lower buttress face having a surface intersecting an axial plane at 25 to 55 degrees from the axis, and a helical thread crest defining a continuously varying major buttress thread diameter which circumscribes the surface of a truncated cone, wherein said buttress thread extends from said shank to cover a portion of said head portion; and,
    circular ribs covering the surface of said shank between adjacent turns of said buttress thread, said ribs extending 0.001 to 0.08 inches from said shank surface and having a pitch between said buttress thread pitch and an equal pitch in the opposite screw direction.

* * * * *